United States Patent [19]
Becker

[11] 3,934,687
[45] Jan. 27, 1976

[54] HYDRAULIC COUPLING FLUID CLUTCHES

[75] Inventor: John Edward Becker, Bowmanville, Canada

[73] Assignee: Cluaran Associates Ltd., Oshawa, Canada

[22] Filed: Aug. 19, 1974

[21] Appl. No.: 498,672

[30] Foreign Application Priority Data
Aug. 22, 1973   United Kingdom............... 39711/73

[52] U.S. Cl. .................... 192/3.23; 60/357; 60/359
[51] Int. Cl.² ......................................... F16D 67/00
[58] Field of Search ............. 60/347, 357, 359, 364; 192/3.23

[56] References Cited
UNITED STATES PATENTS

| | | | |
|---|---|---|---|
| 2,707,376 | 5/1955 | Anderson............................. | 60/359 |
| 2,878,642 | 3/1959 | Maurice et al..................... | 60/359 X |
| 3,751,923 | 8/1973 | Becker................................ | 60/359 |

Primary Examiner—Edgar W. Geoghegan
Attorney, Agent, or Firm—Hirons & Rogers

[57] ABSTRACT

A valve-controlled hydraulic coupling fluid clutch is provided with a reservoir compartment containing first and second chambers, the first chamber receiving liquid from the working chamber during normal operation, while the second chamber receives such liquid only while the turbine is stalled or slowed excessively. Liquid flow means are provided between the two chambers of less capacity than means feeding liquid into the second chamber. Operator controlled valve means between the first reservoir chamber and the coupling working chamber are normally open and upon closing retain liquid in the first reservoir compartment to declutch the coupling, while automatic declutching takes place upon the slowing or stalling of the turbine to prevent overload by removal of working liquid from the working chamber into the second compartment.

8 Claims, 2 Drawing Figures

HYDRAULIC COUPLING FLUID CLUTCHES

FIELD OF THE INVENTION

The present invention is concerned with improvements in or relating to hydraulic couplings of the type that are operable as fluid clutches.

DEFINITION OF THE INVENTION

It is an object of the invention to provide a new hydraulic coupling fluid clutch permitting rapid clutching and declutching.

In accordance with the present invention there is provided a new hydraulic coupling fluid clutch comprising co-operating pump and turbine elements each having radial vortex-producing vanes and forming a working chamber, a reservoir chamber carried by the pump or turbine element, said reservoir chamber comprising two separate compartments connected by flow means, means for feeding the liquid from the working chamber separately to the two compartments of the reservoir chamber, the said feeding means feeding liquid to one compartment under normal operating conditions of the coupling and feeding liquid to the other compartment under stall operating conditions, valve means returning liquid from the reservoir chamber to the working chamber, the said valve means connecting the said one compartment and the working chamber, and the said flow means between the compartments being of less flow capacity than the means feeding liquid to the other compartment, and operator-controlled means for closing the valve means to retain the liquid in the reservoir chamber and thereby declutch the coupling.

DESCRIPTION OF THE DRAWINGS

Particular preferred embodiments of the invention will now be described, by way of example, with reference to the accompanying diagrammatic drawings, wherein.

DESCRIPTION OF THE PREFERRED EMBODIMENTS

Figure 1:
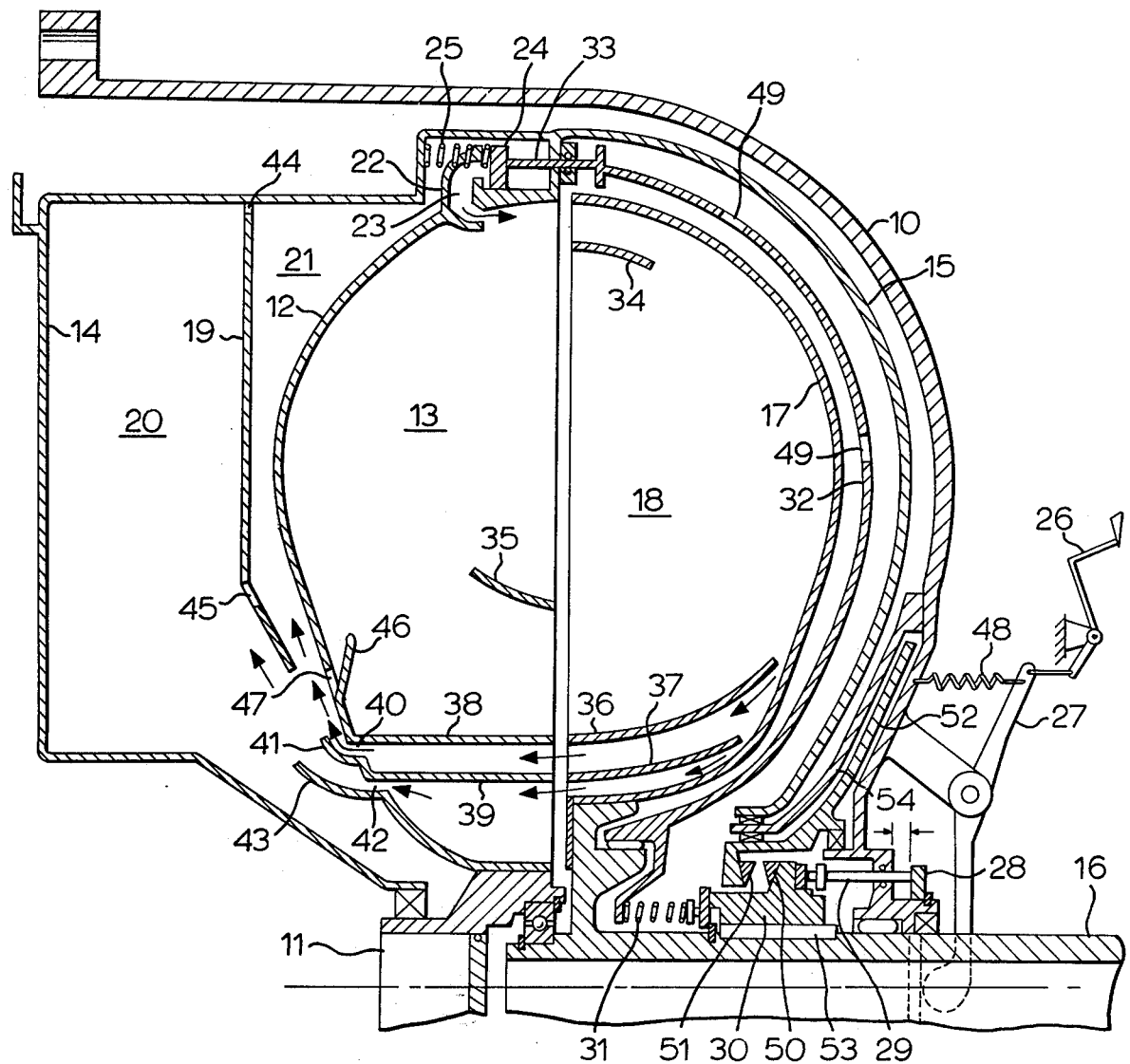
FIG. 1 is a plane cross-section through the upper part of a first embodiment taken along the longitudinal axis thereof.

The fluid clutch coupling is enclosed in an outer casing 10 adapted to be mounted to the corresponding casing of its driving motor (not shown). The pump or impeller part of the coupling is mounted on a power input shaft 11 for rotation therewith and comprises a pump chamber casing 12 with the usual radial vanes 13, a reservoir casing 14 and a shroud 15 extending parallel to the casing 10. The turbine or runner part of the coupling is mounted on a power output shaft 16 and comprises a turbine chamber casing 17 with the usual radial vanes 18.

The reservoir casing 14 contains an annular baffle 19 dividing the interior thereof into two separate compartments 20 and 21. The interior of the compartment 21 can connect with the pump compartment interior via a series of circumferentially disposed valves each constituted by a valve casing part 22, a valve opening 23 and a valve closure member 24. The valves are biased open by compression springs 25 and can be closed by operation of an operators pedal 26 via a spring biased crank lever 27, transfer ring 28, push rods 29, clutch member 30, compression springs 31, valve operator 32 and push rods 33.

Operating liquid circulating in the usual vortices is guided by deflectors 34 and 35, and some of the liquid is interrupted by deflector 36, passing into a turbine passage formed between turbine deflectors 36 and 37 and then into a pump passage formed between deflectors 38 and 39, from which it passes via aperture 40 and director 41 into the compartment 21. The liquid in the compartment 21 returns immediately to the working circuit via the open valve. The pump and turbine chambers therefore remain at the required filling for normal operation.

With the coupling operating under load and normal slip normal vortices are formed. If the turbine is stalled then the vortices are disrupted and the liquid flows into a turbine passage formed between deflector 37 and casing 17, thence into the passage between deflector 39 and casing 12, and via aperture 42 and director 43 into the chamber 20.

The liquid in the compartment 20 can bleed relatively slowly to the compartment 21 via openings 44, but liquid will enter more quickly than can escape this way and the reservoir compartment 20 will quickly fill until liquid spills via overflow apertures 45 into the compartment 21. The quantity of liquid retained by the compartment 20 under these conditions is just sufficient that the vortices remaining in the working compartment can only transmit about the maximum available power from the engine, enabling it to keep operating at an efficient speed and not be stalled by the stalled coupling.

Upon any reverse flow of liquid in the working compartment, such liquid is caught by catches 46 and passes through apertures 47 into either or both of the compartments.

To declutch the operator depresses the pedal 26 against the action of a spring 48 and thereby operates the valve closing mechanism. With the valve closed both compartments 20 and 21 now fill and the working chamber is quickly emptied of its contents. Apertures 49 in the member 32 permit liquid to flow freely from one side to the other as it moves. After emptying the turine will keep running due to its momentum, and this may cause difficulty in engagement etc. of any subsequent mechanical gear train. To prevent this the movement of the clutch member 30 that is required to fully declutch the coupling causes engagement of clutch teeth 50 and 51 respectively on the member 30 and a brake rotor 52, the member 30 sliding on splines 53. The rotor rotates in a chamber formed between the outer casing 10 and a supplementary casing 54 fastened thereto, this chamber being filled with a viscous liquid so that it applies the necessary braking torque to the turbine. As the valve moves to the open condition to re-clutch the coupling then the turbine brake is automatically disengaged.

When the vehicle is moving while shifting gears the turbine should be allowed to run. This is obtained by depressing the clutch pedal sufficiently to close the valve opening 23, but not sufficiently to engage the clutch teeth 50 and 51, so that the working circuit is emptied but the clutch is not engaged.

Figure 2:
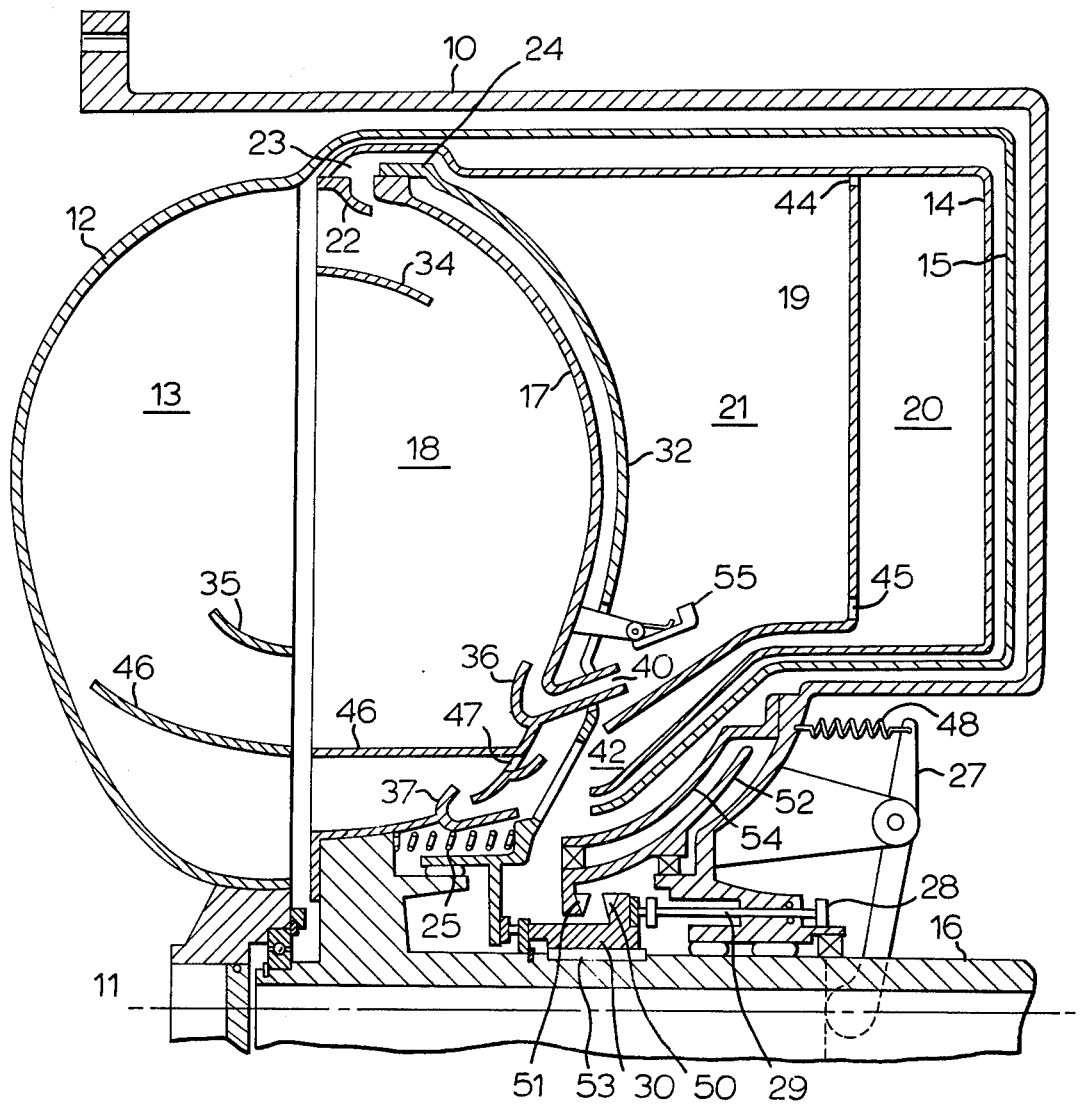
FIG. 2 is a similar cross-section through a second embodiment.

In the embodiment of FIG. 2 similar parts are given the same reference number. It will be seen that the reservoir is in this embodiment carried by the turbine and not by the pump, but otherwise its operation is essentially the same. When the turbine has slowed or stopped the liquid therein will fall to the bottom and may flow back into the working circuit causing a larger drag then can be overcome by the rotor 52. To prevent this speed-sensitive valves 55 are provided which close the opening 40 unless the turbine is rotating at more than a predetermined minimum speed.

I claim:

1. A hydraulic coupling fluid clutch comprising co-operating pump and turbine elements each having radial vortex-producing vanes and forming a working chamber, a reservoir chamber carried by the pump or turbine element, said reservoir chamber comprising two separate compartments connected by flow means, means for feeding the liquid from the working chamber separately to the two compartments of the reservoir chamber, the said feeding means feeding liquid to one compartment under normal operating conditions of the coupling and feeding liquid to the other compartment under stall operating conditions, valve means returning liquid from the reservoir chamber to the working chamber, the said valve means connecting the said one compartment and the working chamber, and the said flow means between the compartments being of less flow capacity than the means feeding liquid to the other compartment, and operator-controlled means for closing the valve means to retain the liquid in the reservoir chamber and thereby declutch the coupling.

2. The invention as claimed in claim 1, wherein the said reservoir chamber comprises two separate compartments connected by flow means, the said feeding means feeding liquid to one compartment under normal operating conditions of the coupling and feeding liquid to the other compartment under stall operating conditions, the said valve means connecting the said one compartment and the working chamber, and the said flow means between the compartments being of less flow capacity than the means feeding liquid to the other compartment.

3. The invention as claimed in claim 1, wherein the said reservoir chamber is carried by the pump element, and the said liquid feeding means are disposed in the turbine element and feed the liquid via passages in the pump element to the reservoir chamber.

4. The invention as claimed in claim 1, wherein the said feeding means comprises first liquid catch means intercepting liquid vortices in the working chamber under normal operating conditions and feeding the intercepted liquid to said one compartment, and second liquid catch means closer to the rotational axis of the coupling and intercepting liquid in the working chamber only under stall operating conditions and feeding it to said other compartment.

5. The invention as claimed in claim 1,
and including a brake for connection to the turbine element and a mechanical clutch operable between the brake and the turbine element to connect the two together, the said operator-controlled means actuating the clutch with closing of the valve means to connect the brake and turbine element together.

6. The invention as claimed in claim 5, wherein the brake comprises a liquid filled annular compartment in the coupling casing and a rotor rotable in the annular compartment, whereby braking torque is produced by friction between the liquid in the brake compartment and the rotor, the mechanical clutch connecting together the turbine element and the rotor.

7. The invention as claimed in claim 1,
wherein the reservoir chamber is carried by the turbine element and the liquid feeding means are provided with speed sensitive valves which close when the turbine element is rotating at less than a predetermined minimum speed to prevent liquid returning from the reservoir to the working chamber.

8. The invention as claimed in claim 1,
wherein the element carrying the reservoir chamber is provided with catch means intercepting liquid flowing in reverse direction in the working chamber and feeding such liquid to the reservoir chamber.

* * * * *